(12) United States Patent
Wallace et al.

(10) Patent No.: US 11,096,375 B2
(45) Date of Patent: Aug. 24, 2021

(54) SMART CATTLE REPRODUCTION MANAGEMENT AND DIGITAL FARM TO MARKET TRANSPARENCY METRICS

(71) Applicant: HIGH TECH RANCH SOLUTIONS, LLC, The Woodlands, TX (US)

(72) Inventors: Mitchell Shaun Wallace, The Woodlands, TX (US); Frank William Almaraz, Montgomery, TX (US)

(73) Assignee: HIGH TECH RANCH SOLUTIONS, LLC, The Woodlands, TX (US)

( * ) Notice: Subject to any disclaimer, the term of this patent is extended or adjusted under 35 U.S.C. 154(b) by 0 days.

(21) Appl. No.: 16/906,362

(22) Filed: Jun. 19, 2020

(65) Prior Publication Data
US 2020/0396962 A1  Dec. 24, 2020

Related U.S. Application Data

(60) Provisional application No. 62/864,405, filed on Jun. 20, 2019.

(51) Int. Cl.
*A61D 17/00* (2006.01)
*A01K 11/00* (2006.01)
*A01K 29/00* (2006.01)

(52) U.S. Cl.
CPC .......... *A01K 11/008* (2013.01); *A01K 29/005* (2013.01); *A61D 17/008* (2013.01); *A01K 11/004* (2013.01)

(58) Field of Classification Search
CPC .. A61D 17/002; A61D 17/004; A61D 17/006; A61D 17/008; A01K 11/004; A01K 29/00
See application file for complete search history.

(56) References Cited

U.S. PATENT DOCUMENTS

| 9,826,714 B2 | 11/2017 | Garrity |
| 10,292,370 B2 | 5/2019 | Mobley |

(Continued)

OTHER PUBLICATIONS

Dyer, Ted G., Reproductive Management of Commercial Beef Cows, University of Georgia Extension, Bulletin 864, obtained from https://secure.caes.uga.edu/extension/publications/files/pdf/B%20864_3.PDF on Jun. 19, 2020.

(Continued)

*Primary Examiner* — Benyam Haile
(74) *Attorney, Agent, or Firm* — Basil M. Angelo; Angelo IP

(57) ABSTRACT

A method of smart cattle reproduction management and digital farm to market transparency metrics tracks, monitors, and predicts reproductive efficiency, providing actionable information that allows the cattle rancher to optimize operations to ensure a high calf crop percentage. Using conventional ear tags to track and monitor the location, temperature, and movement of each animal in the herd, a highly accurate and data-driven reproductive performance score may be calculated for open heifers, cows, and bulls, thereby allowing actions to be taken to enhance reproductive efficiency. In addition, given the high risk of losing a heifer during calving, a method provides a means to detect, in advance and remotely, when a pregnant heifer is about to start calving to allow the cattle rancher to go on site, locate the animal, and provide any veterinary assistance that may be required should the delivery be difficult.

3 Claims, 15 Drawing Sheets

(56) References Cited

U.S. PATENT DOCUMENTS

2009/0312667 A1* 12/2009 Utsunomiya ........ A61D 17/008
  600/549
2010/0321182 A1   12/2010 Wangrud
2013/0340305 A1   12/2013 Mobley

OTHER PUBLICATIONS

Elferink, Maarten and Schierhom, Florian, Global Demand for Food is Rising. Can we Meet it?, published online Apr. 7, 2016, obtained from https://hbr.org/2016/04/global-demand-for-food-is-rising-can-we-meet-it on Jun. 19, 2020.

* cited by examiner

Cow #210

Home > Cattle management > Cow #210

Identification

| | |
|---|---|
| Ear Tag # | 100 |
| Brand | HTR |
| Name | Duke |
| Electronic ID | 6723456 |
| Other ID | 150 |

Descriptive

Status

Calfhood

Raised/purchased information

John Smith
Administrator

Breeding | Performance | Health | Actions | Uploads
Pregnancy | Weaning | Yearling Delete  Sell Add breed

| Pregnancy Status | Pregnancy Check Date | Pregnancy Check Method | Days Pregnant | Estimated Due Date | UltraSound Sex Determination |
|---|---|---|---|---|---|
| Closed | 01/01/2015 | Palpitation | 279 | 01/02/2015 | Male |
| Closed | 10/01/2016 | Ultrasound | 270 | 10/10/2016 | Female |
| Closed | 01/01/2020 | Blood/Urine | 264 | 01/16/2020 | Male |

365

370

377

SMART CATTLE REPRODUCTION MANAGEMENT AND DIGITAL FARM TO MARKET TRANSPARENCY METRICS

CROSS-REFERENCE TO RELATED APPLICATIONS

This application claims the benefit of, or priority to, U.S. Provisional Patent Application Ser. No. 62/864,405, filed on Jun. 20, 2019, which is hereby incorporated by reference in its entirety for all purposes.

BACKGROUND OF THE INVENTION

The global population has quadrupled in the last century and is expected to surge to more than 7 billion people by the year 2050. This growth will drive a corresponding increase in global food demand that is influenced by the changing economic status of the global population. As the per capita income increases, especially in developing countries that historically do not consume large amounts of meat, the demand for animal-based proteins tends to increase. Data suggests that those who can afford it, tend to prefer an animal-based diet. Taken together, expected growth in the global population and changing dietary preferences towards the consumption of animal-based proteins are expected to challenge the ability of the food production industry to keep pace with demand. While models vary, the consensus is that, by the year 2050, global food supply will have a difficult time meeting demand and the demand for animal-based proteins will not be met.

Livestock production already uses approximately one third of global arable land, consumes eight percent of available freshwater, and contributes fifteen percent of global carbon dioxide emissions. As demand for animal-based proteins increase, expansion of operations may not be practicable. Due to increases in global temperatures and scarcity of water resources, there may not be enough arable land and freshwater available to meet demand. This issue is further complicated by the fact that a significant number of cattle producers are already operating at a loss, relying upon subsidies and other sources of income to maintain the business and do not have the financial resources to procure additional land and water resources. As such, the cattle producing industry is facing a perfect storm of outsized demand, scarce resources, and diminishing returns on investment.

BRIEF SUMMARY OF THE INVENTION

According to one aspect of one or more embodiments of the present invention, a method of cattle reproduction management for an open heifer or cow includes receiving information transmitted by a tag disposed on the open heifer or cow, determining if the open heifer or cow is in heat based at least in part on the information received, providing an alert if the open heifer or cow is in heat, determining an amount of time that the open heifer or cow spends within an active breeding proximity circle based at least in part on the information received, calculating a reproductive performance score for the open heifer or cow based at least in part on the received information, and updating a breeding record for the open heifer or cow based on a current heat cycle.

According to one aspect of one or more embodiments of the present invention, a method of cattle reproduction management for a bull includes receiving information transmitted by a tag disposed on the bull, determining an amount of time that the bull spends within an active breeding proximity circle based at least in part on the information received, calculating a reproductive performance score for the bull based at least in part on the received information, and updating a breeding record for the bull.

According to one aspect of one or more embodiments of the present invention, a method of cattle reproduction management for a pregnant heifer or cow includes receiving information transmitted by a tag disposed on the pregnant heifer or cow, where the information includes one or more of an identifier of the pregnant heifer or cow, a location of the pregnant heifer or cow, and a temperature of the pregnant heifer or cow. The method may further include calculating a predicted calving date for the pregnant heifer or cow based on at least one or more of historical data, if any, of prior gestation periods or an estimated gestation period, tracking the location of the pregnant heifer or cow relative to other bovines in a herd, determining if the pregnant heifer or cow is isolating herself from the herd based at least in part on the location of the pregnant heifer or cow relative to the other bovines in the herd, determining if the temperature of the pregnant heifer or cow drops a predetermined amount within a predetermined number of days of the predicted calving date, and providing an alert that the pregnant heifer or cow is calving if the pregnant heifer or cow is isolating from the herd and the pregnant heifer or cow's temperature has dropped the predetermined amount within a predetermined number of days of the predicted calving date.

Other aspects of the present invention will be apparent from the following description and claims.

BRIEF DESCRIPTION OF THE DRAWINGS

FIG. 3D shows a cattle management interface of a client-side software application for smart cattle reproduction management in accordance with one or more embodiments of the present invention.

FIG. 3E shows an animal health interface of a client-side software application for smart cattle reproduction management in accordance with one or more embodiments of the present invention.

FIG. 3H shows a breeding history interface of a client-side software application for smart cattle reproduction management in accordance with one or more embodiments of the present invention.

FIG. 3I shows a pregnancy tracking interface of a client-side software application for smart cattle reproduction management in accordance with one or more embodiments of the present invention.

DETAILED DESCRIPTION OF THE INVENTION

Figure 1B:
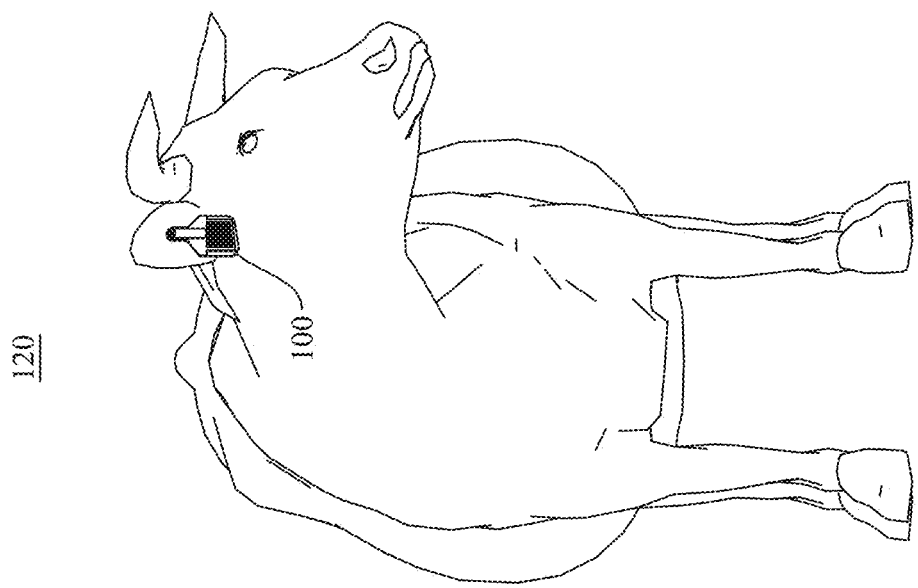
FIG. 1B shows a conventional solar-powered ear tag attached to an exemplary bull for tracking and monitoring

One or more embodiments of the present invention are described in detail with reference to the accompanying figures. For consistency, like elements in the various figures are denoted by like reference numerals. In the following detailed description of the present invention, specific details are set forth to provide a thorough understanding of the present invention. In other instances, well-known features to those of ordinary skill in the art are not described to avoid obscuring the description of the present invention.

The majority of cattle operations in the United States are small scale operations, having fewer than 20 head of cattle in total. On the other end of the spectrum, less than 10% of cattle operations have herds of 100 head or more. As such, small cattle ranching operations constitute a significant part of the supply chain for animal-based proteins that the public has come to rely upon for dietary sustenance. However, cattle ranchers and the cattle ranching industry are facing a number of significant challenges. The majority of small-scale cattle operations are operated at a financial loss. In order to succeed in today's marketplace, cattle ranchers must become proficient in planning, budgeting, and cost accounting. Careful calculation of fixed operating costs and accurate estimation of variable operating costs, such as, for example, veterinarian bills, are necessary to predict expected income. With increased pressure from smaller operating acreage, scarce resources, and the inability to expand operations due to rising land costs, most small-scale cattle ranching operations are struggling to meet expenses, much less make a profit. Many cattle ranchers or their spouses work a second job just to make ends meet. Cattle ranchers often work long hours in extreme temperatures where there is a very real risk of injury or death from operating machinery, fighting fires, and working with large and unruly animals. As cattle ranchers age, they tend to find it difficult to keep pace with the physical demands of the job. Slowing down, however, can reduce animal income, limit earning power, and result in the closure of the cattle ranching operation. While cattle ranchers are typically driven by passion for the animals, the lifestyle, and the nostalgic legacy of cattle ranching rather than money, they have to find a way to operate their business in a financially viable way in order to remain in business.

In the cattle ranching industry, the calf crop percentage is recognized as the bellwether metric of financial success for a cattle ranching operation. The calf crop percentage is the number of calves weaned divided by the number of heifers or cows exposed to the bull to produce that calf crop, multiplied times 100 to get a percentage value. The industry standard is that a cattle ranching operation must average a calf crop percentage of at least 85% to merely meet production expenses. Thus, most cattle ranchers have the aspirational, but rarely realized, goal of attaining a 95% calf crop to ensure profitability. While the calf crop percentage is recognized as a predictor of financial success, there are challenges in calculating the calf crop percentage since some of the numbers required to do the calculation must be collected over the course of a year or more, if they can be collected at all. While cattle ranchers are typically well intentioned, it can be difficult, if not impossible, to accurately track this information today, because the majority of this information is recorded by in-person observation of the animals on site and they simply cannot monitor all of the animals all the time. It becomes increasingly challenging as the number of pastures and head of cattle increase. As such, most cattle ranchers simply focus on the health of their herd, scoring their body condition, and some will even attempt to control the calving season, in an attempt to enhance the calf crop percentage, and ultimately, the financial viability of their operation. Notwithstanding, a large number of cattle ranching operations have a calf crop percentage less than 85%, causing significant financial hardship on the cattle ranchers.

Accordingly, in one or more embodiments of the present invention, a method of smart cattle reproduction management and digital farm to market transparency metrics tracks, monitors, and predicts reproductive efficiency, providing actionable information that allows the cattle rancher to optimize operations to ensure a high calf crop percentage. Using conventional ear tags to track and monitor the location, temperature, and movement of each animal in the herd, a highly accurate and data-driven reproduction score may be calculated for open heifers, cows, and bulls, thereby allowing actions to be taken to enhance reproductive efficiency. In addition, given the high risk of losing a heifer during calving, a method provides a means to detect, in advance and remotely, when a pregnant heifer is about to start calving to allow the cattle rancher to go on site, locate the animal, and provide any veterinary assistance that may be required should the delivery be difficult. Advantageously, the cattle rancher make track, monitor, and enhance the reproduction efficiency of the herd remotely, resulting in an improved calf crop percentage. Moreover, a method of ranch management allows for the formation of a collective of cattle ranchers that may jointly manage and share resources and go to market with the bargaining power of a larger producer. In addition, a method provides complete and total transparency to enhance the value and marketability of beef products for the buyer and the ultimate consumer, thereby enhancing profitability.

Figure 1A:
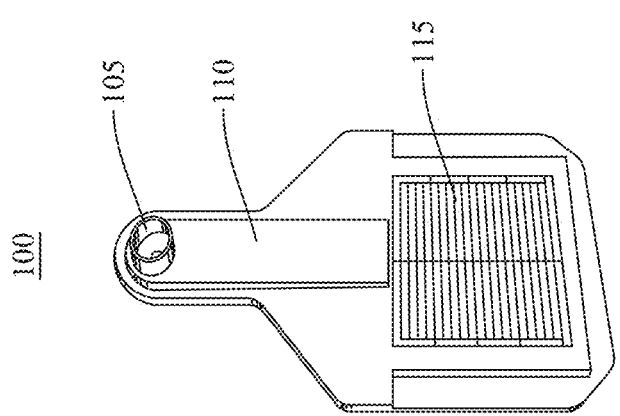
FIG. 1A shows a conventional solar-powered ear tag for cattle tracking and monitoring.
Figure 1C:
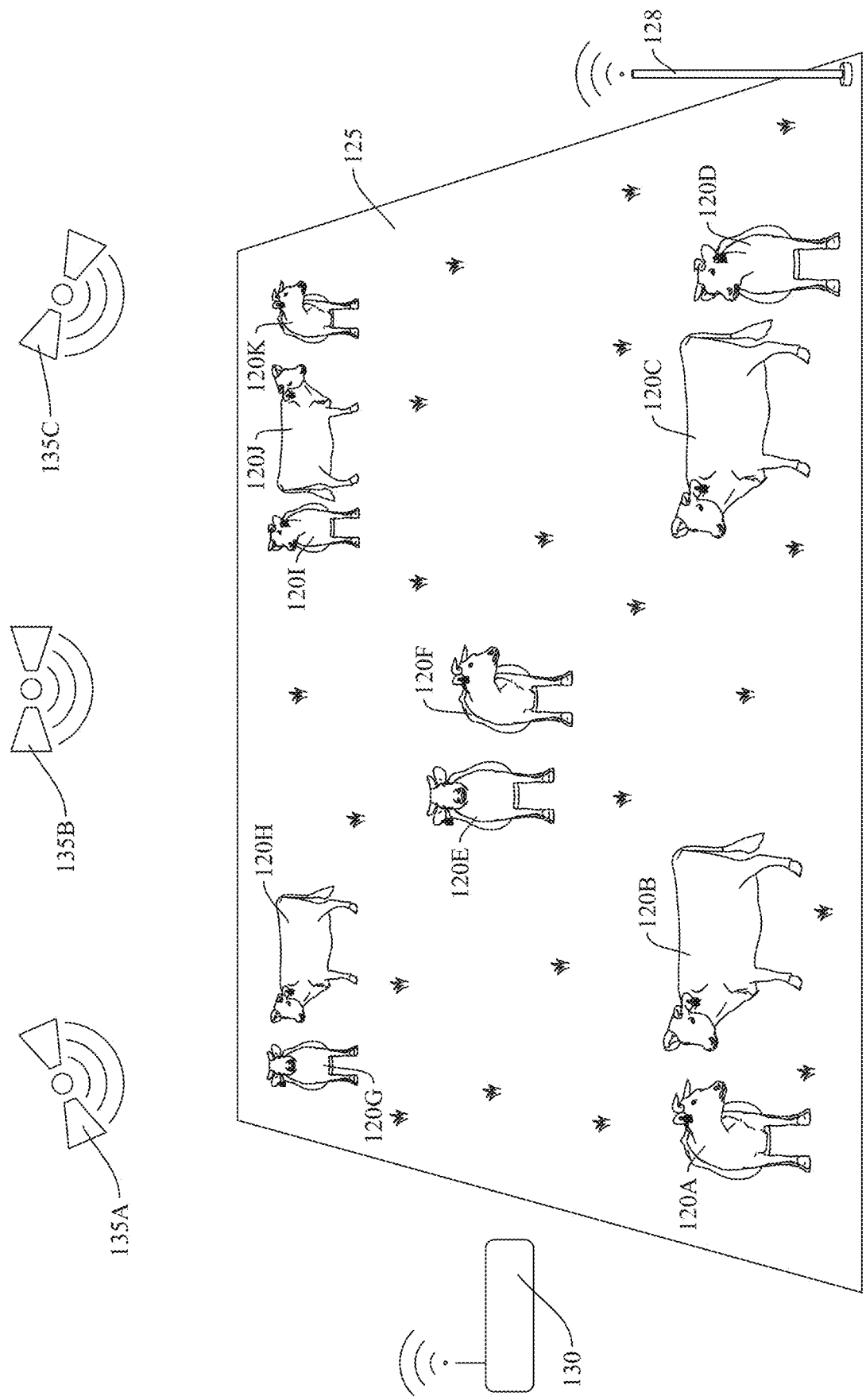
FIG. 1C shows a herd of cattle in a pasture tracked and monitored with conventional solar-powered ear tags.

FIG. 1A shows a conventional solar-powered ear tag 100 for cattle tracking and monitoring. Ear tag 100 is a lightweight, waterproof, and ruggedized device that is typically disposed on the ear of a heifer, cow, or bull. Each tag 100 typically includes a single prong attachment mechanism 105 that facilitates puncturing the animal's ear, typically in the middle of the ear between cartilage ribs near where the animal's ear attaches to its head, and securing the tag 100 to the animal. The tag 100 typically includes an electronics portion 110 that may include one or more sensors, receivers, and transmitters and a battery and solar charging portion 115 that powers the tag 100. However, some ear tags are solely battery powered. The electronics 110 may include one or more sensors, such as, for example, a temperature sensor (not shown) that senses the animal's temperature. The electronics 110 may also include one or more receivers, such as, for example, a Global Positioning System ("GPS") receiver that determines a current location of the tag 100 based on electromagnetic signals received from GPS satellites (not shown). However, other types or kinds of ear tags may not rely on GPS and may instead use triangulation, trilateration, or other technology or techniques to determine a location of the ear tag as proxy for the animal. The electronics 110 may also include one or more transmitters, such as, for example, a SemTech® LoRa® Wide Area Network ("WAN") transmitter that transmits sensed data and received data from the tag 100 to a LoRa® WAN field antenna (not shown) or a LoRa® WAN gateway device (not shown). The LoRa® WAN transmitter can typically transmit data over long distances of 5 miles or more using the radio frequency band. One of ordinary skill in the art will recognize that conventional cattle ear tags may be battery powered, solar powered, or a hybrid that uses a battery power as well as a solar cell to extend the usable life of the tag. One of ordinary skill in the art will also recognize that cattle ear tags are well known in the industry and may vary in the type, kind, or number of communications, transmitter(s), receiver(s), and sensor(s) that they employ. While solar-powered LoRa®-enabled ear tags are described herein, they are merely exemplary and one of ordinary skill in the art will recognize that any other type or kind of ear tag, including those that use different communications technology, may be used in accordance with one or more embodiments of the present invention. As such, one of ordinary skill in the art will recognize that any ear tag capable of transmitting information that conveys location and temperature information about the animal, whether directly or indirectly, may be used in accordance with one or more embodiments of the present invention. Continuing, FIG. 1B shows a conventional solar-powered ear tag 100 attached to an exemplary bull 120 for tracking and monitoring Continuing, FIG. 1C shows a herd of cattle 120 in a pasture 125 that is tracked and monitored with conventional solar-powered ear tags (e.g., 100). The constituent heifers, cows, or bulls 120 from the herd typically roam freely within the pasture 125 and may be located anywhere within the pasture 125 at any given time. Each tag (e.g., 100) may include a GPS receiver (not independently shown, e.g., 110 of tag 100) that receives GPS signals (not shown) from one or more GPS satellites (e.g., 135A, 135B, and 135C) in geosynchronous orbit. Because of the vast constellation of GPS satellites 135, there are typically at least four GPS satellites 135 within range of any GPS receiver located anywhere on the planet. Each GPS satellite 135 transmits a GPS signal (not shown) that includes information about the satellite's 135 current position and the satellite's current time at regular intervals. The GPS receiver (e.g., 110 of tag 100) receives one or more of these GPS signals (not shown) and calculates how far away it is from each satellite based on how long it took for each respective GPS signal (not shown) to arrive at the GPS receiver (e.g., 110 of tag 100). If the GPS receiver (e.g., 110 of tag 100) receives a GPS signal (not shown) from at least three GPS satellites 135, the location of the GPS receiver (e.g., 110 of tag 100) may be determined with a high degree of accuracy by, for example, the process of trilateration. The location of the GPS receiver (e.g., 110 of tag 100) may be determined continuously, periodically, or upon the occurrence of a triggering event. The accuracy of the GPS derived location may be enhanced through a number of well-known accuracy-enhancing techniques, including, for example, the use of the existing field antennas, gateways, Wi-Fi access points, or cellular towers. Because the locations of these fixed assets may be known with a high degree of accuracy, each tag (e.g., 100) may measure the signal strength of signals broadcast by these fixed assets to enhance the accuracy of the location determination. The tags (e.g., 100) may transmit their sensed data, such as, for example, the animal's current temperature, as well as received data or data derived therefrom, for example, the animal's current location, to the nearest LoRa® WAN field antenna 128 that transmits data to a LoRa® WAN gateway 130.

Figure 2A:
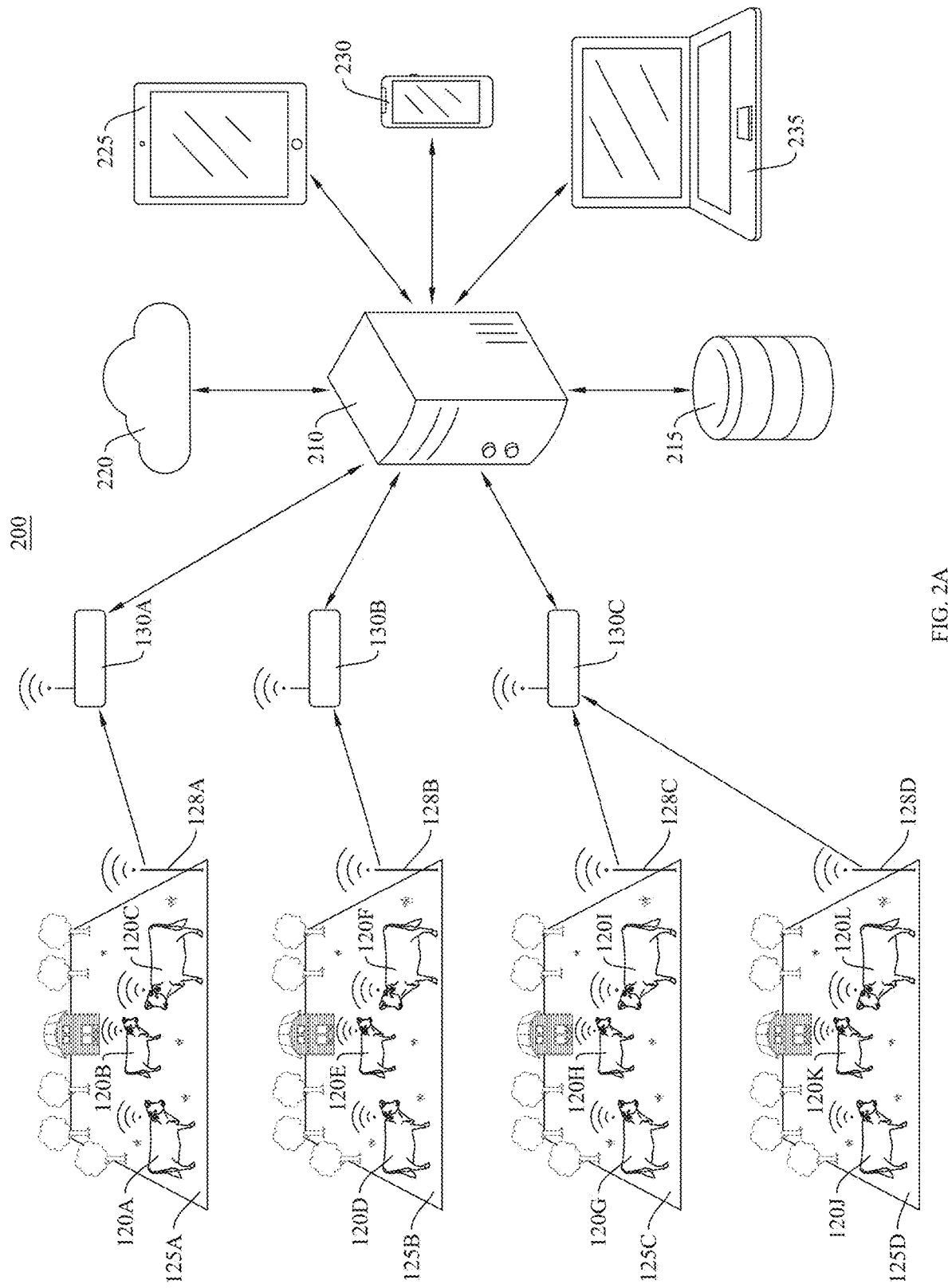
FIG. 2A shows a system for smart cattle reproduction management in accordance with one or more embodiments of the present invention.

FIG. 2A shows a system for smart cattle reproduction management 200 in accordance with one or more embodiments of the present invention. While the exemplary embodiment described herein may use LoRa® communications technology, one of ordinary skill in the art will appreciate that other commercial available ear tags and tracking and tracing systems, including those that do not use LoRa®, may be used in accordance with one or more embodiments of the present invention. One of ordinary skill in the art will recognize that any ear tag system may be used so long as it is capable of providing, directly or indirectly, the location and temperature of the animal with a reasonable degree of accuracy.

In certain embodiments, each pasture 125 may include one or more field antennas 128, in this example, a LoRa® WAN field antenna 128, that provide sufficient coverage of the pasture 125 such that they can receive data from each ear tag (e.g., 100) within the pasture 125. Each ear tag (e.g., 100) may transmit data to the nearest field antenna 128, in this example LoRa® WAN field antenna 128, typically over a radio frequency band, but may vary based on the communications system employed by a particular ear tagging system used. The field antennas 128 may transmit the received data to the nearest gateway 130, in this example, a LoRa® WAN gateway 130, typically over a radio frequency band, but again may vary based on the communications system employed by a particular ear tagging system used. One or more field antennas 128, such as, for example, 128C and 128D, may transmit data to the same gateway 130C. Each gateway 130 may exchange data with a network server 210 configured to execute a server-side software application for smart cattle reproduction management (not shown). The gateway 130 may communicate with the network server 210 over a fixed network connection, a wireless network connection, a cellular network connection, a satellite network connection, or an existing network connection available on the property. One of ordinary skill in the art will recognize that network server 210 may be a physical server, a virtual server, or a physical or virtual server hosted by a third-party, such as, for example, Amazon® AWS®, Microsoft® Azure®, or Google® Cloud Platform®. Network server 210 may include local storage 215 including one or more fixed-disk or fixed-disk arrays and may include cloud-based storage 220 hosted by a third-party. A plurality of client-side computing systems (e.g., tablet 225, smartphone 230, and laptop 235) may execute a client-side software application for smart cattle reproduction management (not shown) that interfaces with the server-side software application for smart cattle reproduction management (not shown) over a network connection. The devices (e.g., 225, 230, and 235) executing the client-side software application typically interfaces with the server-side software application executing on the network server 210 via a fixed network connection, a wireless network connection, a cellular network connection, or a satellite network connection.

Figure 2B:
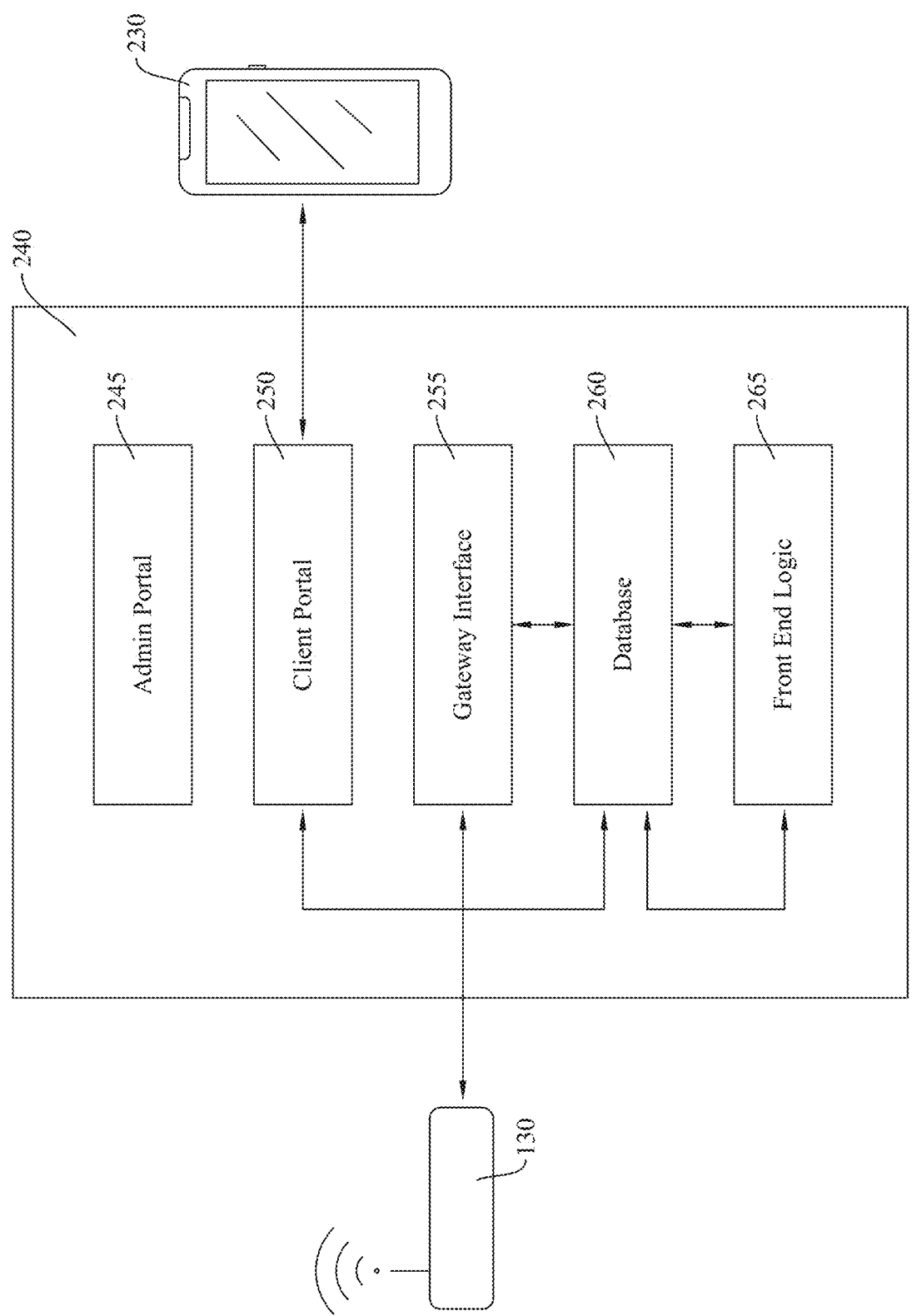
FIG. 2B shows a block diagram of a server-side software application for smart cattle reproduction management in accordance with one or more embodiments of the present invention.

FIG. 2B shows a block diagram of a server-side software application for smart cattle reproduction management 240 in accordance with one or more embodiments of the present invention. Server-side software application 240 may include an admin portal 245 that provides an administrator with either a direct interface via the network server (e.g., 210) or web-based portal interface (not shown) to set up, configure, and manage the server-side software application 240. Server-side software application 240 may include a client portal 250 that facilitates the interface between the server-side software application 240 and the client-side software application (not shown), if any, executing on a plurality of user devices, e.g., smartphone 230. However, in some embodiments, the client-side software application (not shown) may be a web-based portal (not shown) to the server-side software application 240. Server-side software application 240 may include a gateway interface 255 that facilitates the interface between a plurality of LoRa® WAN gateway 130 devices and the software application 240. Server-side software application 240 may include a database portion 260 that stores relevant data received from the gateway interface 255 and the client portal 250 as well as data generated by the front end logical portion 265 that performs the logical operations of the server-side software application 240. One of ordinary skill in the art will recognize that the server-side software application 240, or the components thereof, may vary based on an application or design in accordance with one or more embodiments of the present invention.

In one or more embodiments of the present invention, the server-side software application 240 may include front end logic 265 that provides for operational management, business insight, calculation, and optimization for cattle ranching operations. In this way, server-side software application 240 may provide for remote monitoring to reduce labor overhead, mitigate risk, gather data, and provide data-driven insights into operations that allow cattle ranchers to optimize the use of resources and enhance profitability. For example, most ranchers are not physically present on site at the ranch all the time, the software application 240 provides remote visibility into operations providing for control and peace of mind even when the rancher is thousands of miles away. The tracking aspects of the software application 240 keeps track of head count without requiring on site visual observation and provides alerts to the rancher when, for example, an animal goes outside a geofenced pasture, is inactive due to injury or illness, is experiencing illness, is anticipated to be going into labor, or is fact going into labor. Moreover, operational aspects, such as on-site cameras, water trough levels, gate open or closed status, hay temperature, soil temperature, and moisture monitoring may be tracked.

Figure 3A:
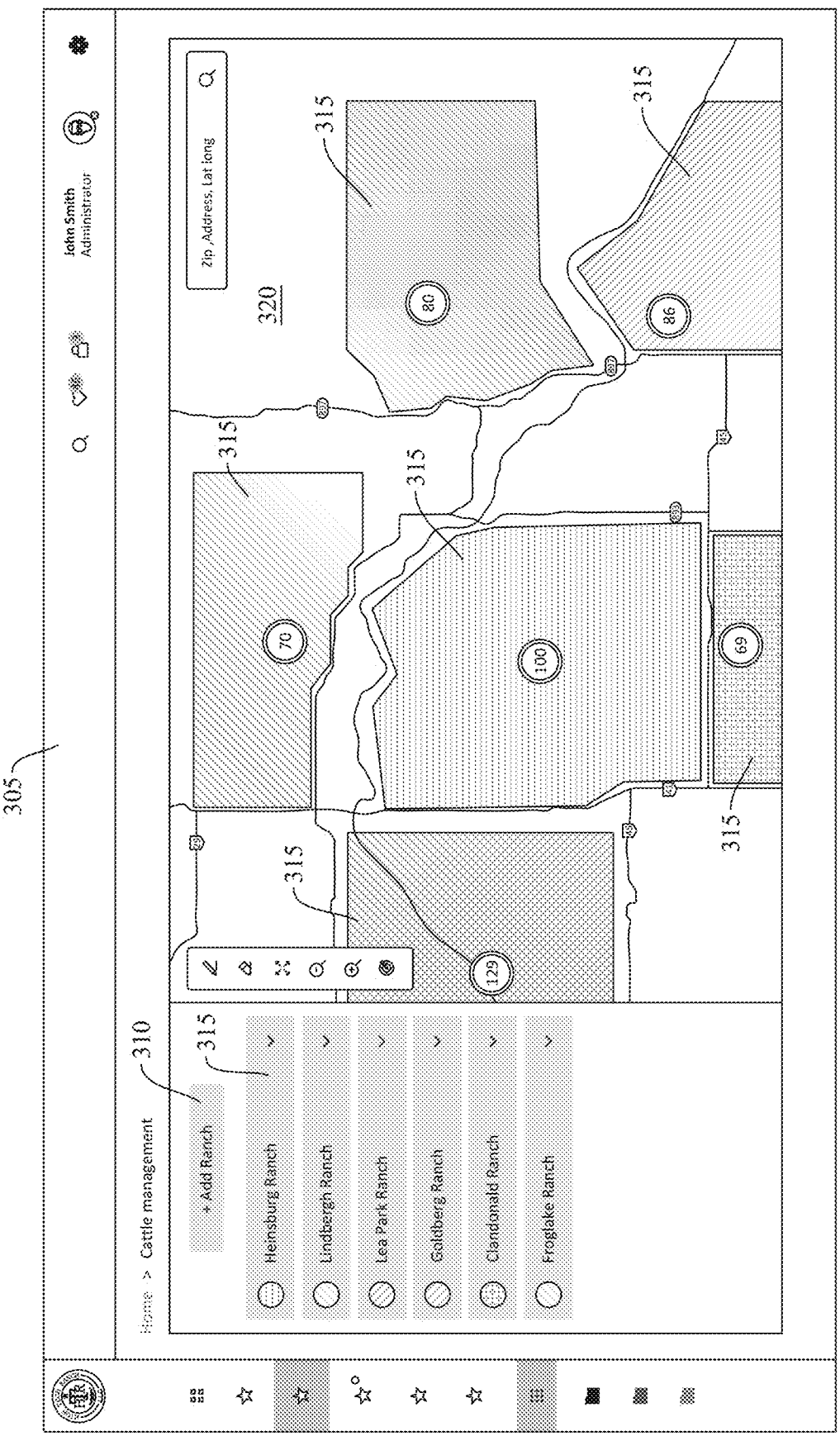
FIG. 3A shows a ranch management interface of a client-side software application for smart cattle reproduction management in accordance with one or more embodiments of the present invention.

FIG. 3A shows a ranch management interface 305 of a client-side software application for smart cattle reproduction management in accordance with one or more embodiments of the present invention. The client-side software application (not independently illustrated) may be executed on a client device, such as, for example, a smartphone, a tablet, a laptop, or other computing system (not shown) and in certain embodiments the client-side software application (not shown) may be a web-based portal to the server-side software application (e.g., 240). The ranch management interface 305 may allow a user or administrator (not shown) to add 310, delete, change, or view ranches 315 within the system. The interface 305 may include a map-based interface 320 that shows the constituent ranches 315, their boundaries, and their head count visually on the map. In this way, a user or administrator (not shown) may add 310 one or more ranches 315 based on an address, coordinates, or by browsing the map. In certain embodiments, the user or administrator (not shown) may define a ranch 315 by drawing an outline of the ranch property on the map 320.

Figure 3B:
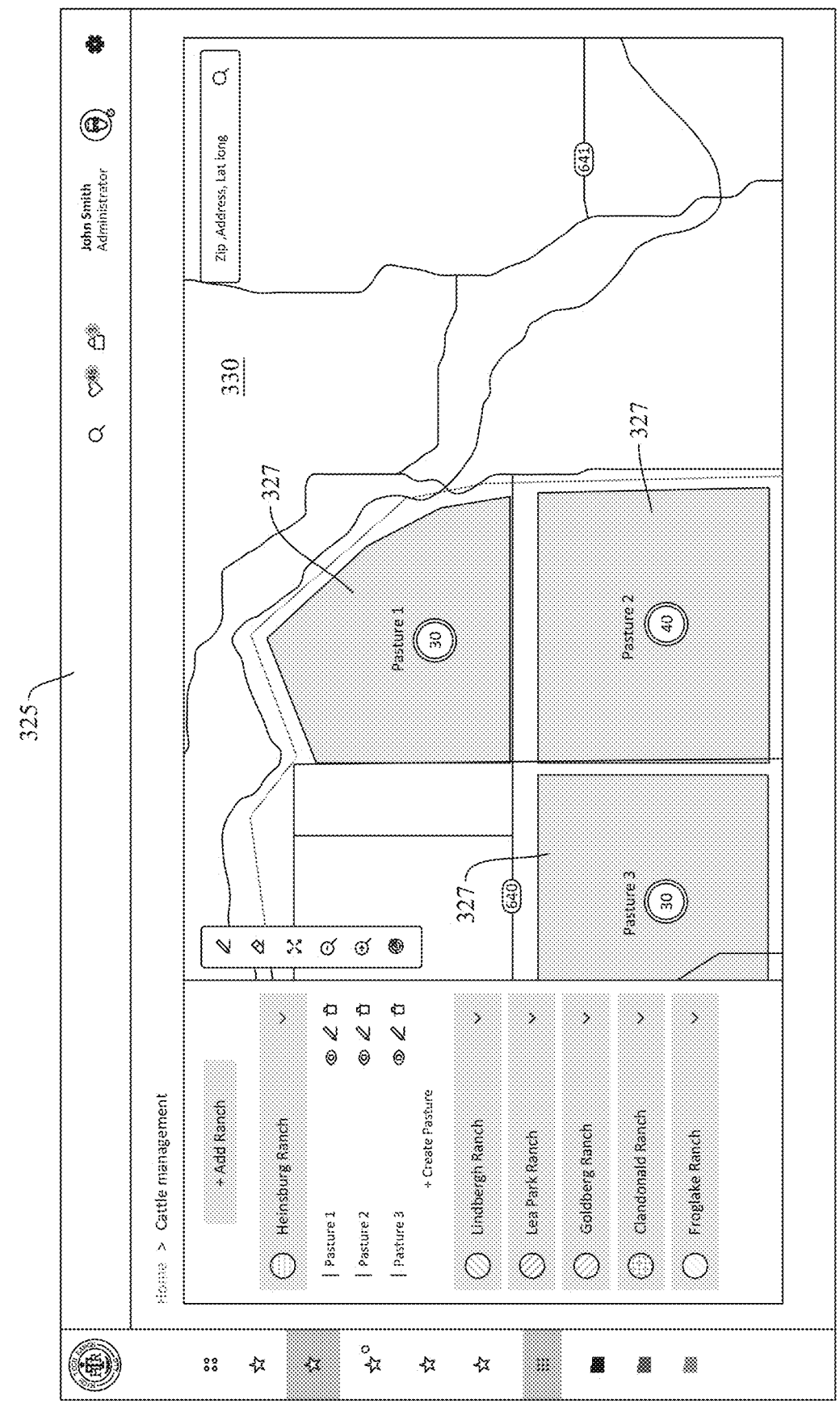
FIG. 3B shows a pasture management interface of a client-side software application for smart cattle reproduction management in accordance with one or more embodiments of the present invention.

Continuing, FIG. 3B shows a pasture management interface 325 of a client-side software application for smart cattle reproduction management in accordance with one or more embodiments of the present invention. Once a ranch (e.g., 315) is added, the pasture management interface 325 may allow a user or administrator (not shown) to add, delete, change, or view one or more pastures 227 for a given ranch (e.g., 315). The interface 325 may include a map-based interface 330 that shows pastures 227, their boundaries, and their head count visually on the map. In this way, a user or administrator (not shown) may add one or more pastures 327 based on an address, coordinates, or by browsing the map. In certain embodiments, the user or administrator (not shown) may define a pasture 327 by drawing an outline of the pasture property on the map 330.

Figure 3C:
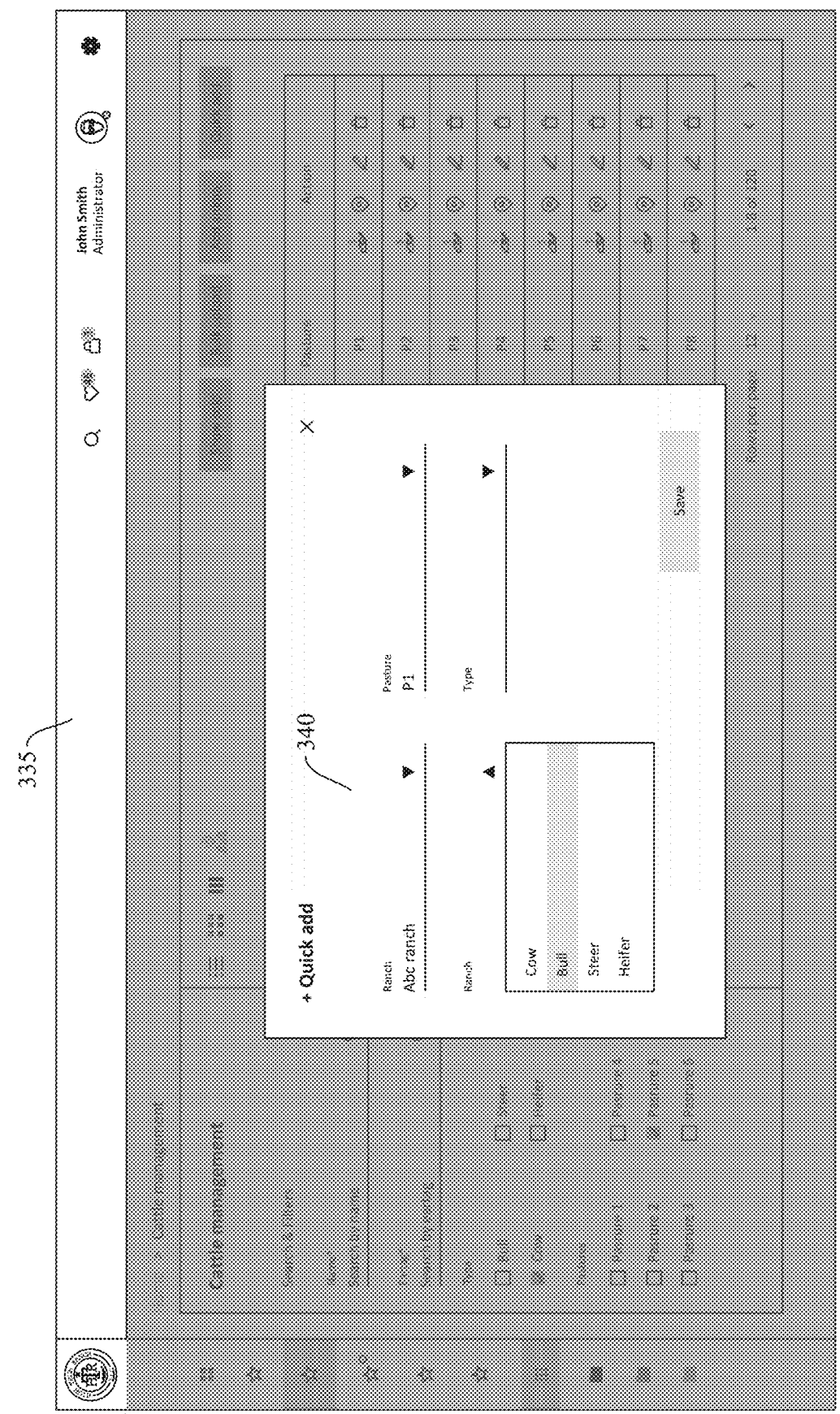
FIG. 3C shows a quick add interface for cattle management of a client-side software application for smart cattle reproduction management in accordance with one or more embodiments of the present invention.

Continuing, FIG. 3C shows a quick add interface 335 of a client-side software application for smart cattle reproduction management in accordance with one or more embodiments of the present invention. Once a heifer, cow, or bull has been properly tagged (e.g., 100), the animal may be added to the user's respective database. The user or administrator (not shown) may add data manually via an interface 340, such as, for example, a unique identifier of the tag (e.g., 100), the ranch they are owned by, the pasture they are currently located in, the type of animal, and any other relevant information. One of ordinary skill in the art will recognize that the data may vary based on an application or design in accordance with one or more embodiments of the present invention. In certain embodiments, once the herd is properly tagged (e.g., 100), some or all of the information may be auto-populated based on the location of each animal reported via their respective tag (e.g., 100). For example, if the server-side software application (e.g., 240) receives location information for one or more animals, identified by the unique identifier of the tag (e.g., 100), the application may determine that, based on the received location information, that the animal is in a particular pasture (e.g., 327) of a particular ranch (e.g., 315) and assume that is an animal properly associated with that pasture (e.g., 327) and that ranch (e.g., 315). In auto-population cases, the server-side software application (e.g., 240) may provide an alert to a user or administrator (not shown) to advise them of the added cattle and request their confirmation that those cattle are in fact their respective property.

Figure 3E:
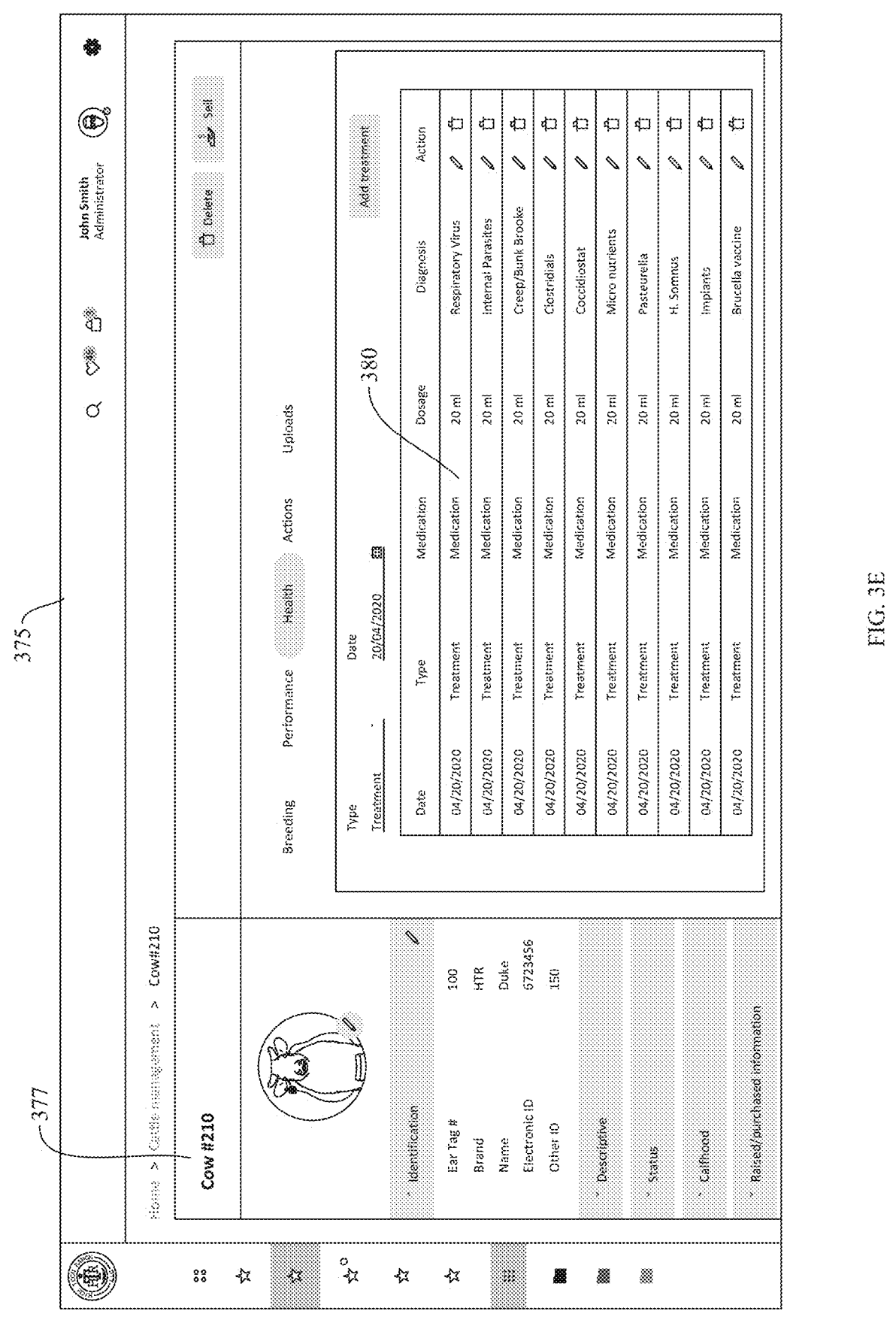

Continuing, FIG. 3D shows a cattle management interface 345 of a client-side software application for smart cattle reproduction management in accordance with one or more embodiments of the present invention. In the cattle management interface 345, a user or administrator (not shown) may search, browse, add, delete, or change information about their animals. For example, a record 350 of an animal may include a unique identifier associated with their ear tag (e.g., 100), a name, if any, a type of animal, namely, a heifer, cow, or bull, an age, a last known weight, a body condition score, the pasture they are currently located in, and the ranch that they are associated with. One of ordinary skill in the art will recognize that the information in the record 350 may vary based on an application or design in accordance with one or more embodiments of the present invention. Continuing, FIG. 3E shows an animal health interface 375 of a client-side software application for smart cattle reproduction management in accordance with one or more embodiments of the present invention. In the animal health interface 375, a user or administrator (not shown), may search, browse, add, delete, or change information relating to an animal's health. For example, each animal, in the figure, exemplary cow 377, may have a health record 380 that includes dates, diagnoses, treatments, medications, dosages, and the like that are maintained for the life of the animal. One of ordinary skill in the art will recognize that the information in the health record 380 may vary based on an application or design in accordance with one or more embodiments of the present invention.

Figure 3F:
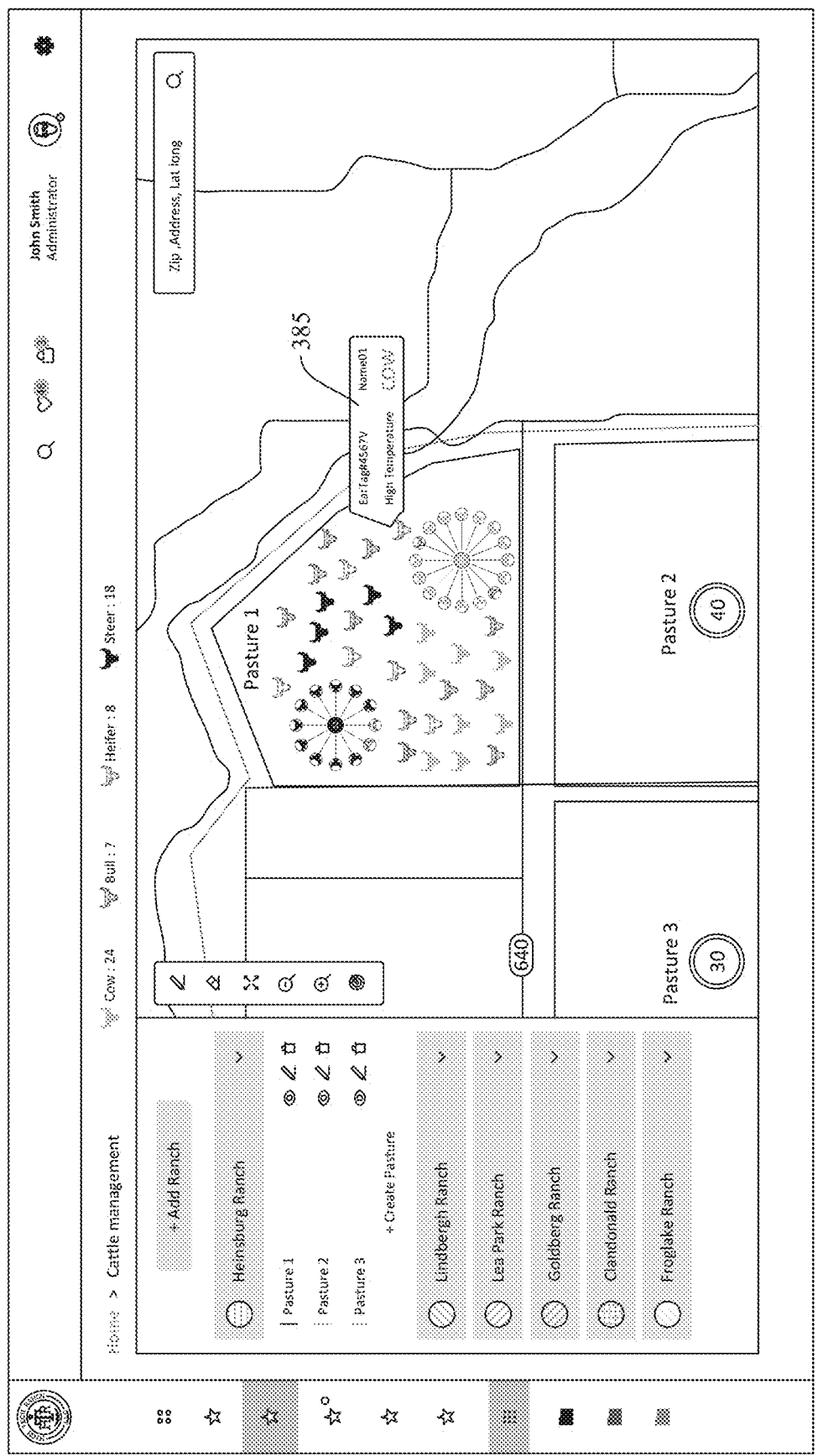
FIG. 3F shows an animal temperature alert of a client-side software application for smart cattle reproduction management in accordance with one or more embodiments of the present invention.
Figure 3G:
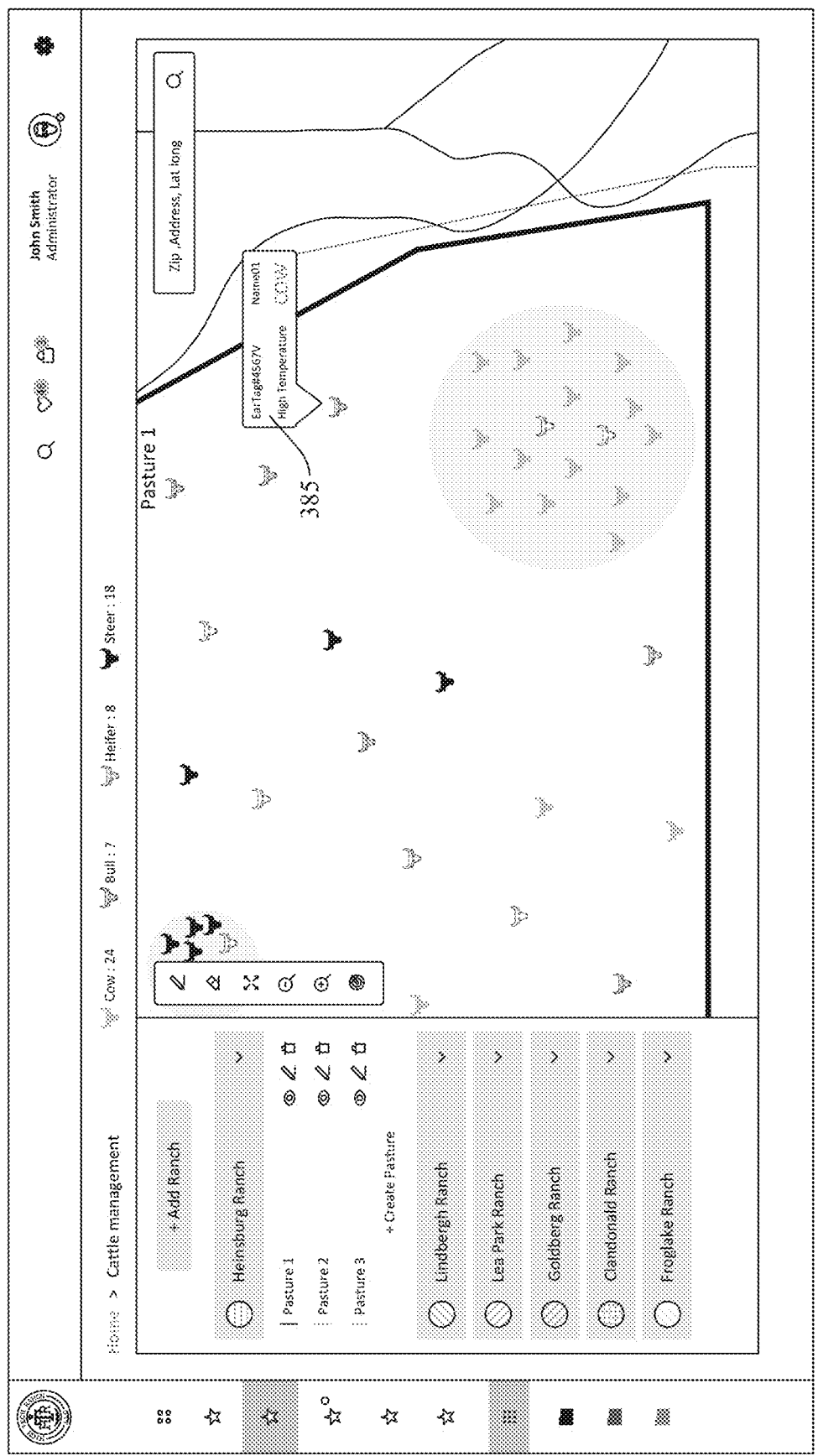
FIG. 3G shows a location of an animal that is the subject of an exemplary animal temperature alert of a client-side software application for smart cattle reproduction management in accordance with one or more embodiments of the present invention.

Continuing, FIG. 3F shows an animal temperature alert 385 of a client-side software application for smart cattle reproduction management in accordance with one or more embodiments of the present invention. In certain embodiments, each ear tag (e.g., 100) may include a sensor configured to sense the animal's temperature. In this way, the ear tags (e.g., 100) may report the current location and the current temperature of each animal in the herd to the server-side software application. The front-end logic (e.g., 265) of the server-side software application (e.g., 240) may include historical data about each animals' temperature, the current outdoor temperature, and a threshold above or below which is deemed abnormal. Continuing, FIG. 3G shows a location of an animal that is the subject of an animal temperature alert 385 of a client-side software application for smart cattle reproduction management in accordance with one or more embodiments of the present invention. If an animal's temperature exceeds a predetermined threshold or falls below a predetermined threshold, a temperature alert 385, showing the location of the animal in the pasture, may be provided to the user or administrator (not shown) so that they may visit the animal and determine whether veterinary services are required. By quickly identifying a temperature condition, actions may be taken as early as possible to achieve the most favorable health outcome for the animal. In certain embodiments, changes in temperature may be used in part to calculate a reproduction performance score for open heifers or cows, or bulls as described in more detail herein.

Figure 3H:
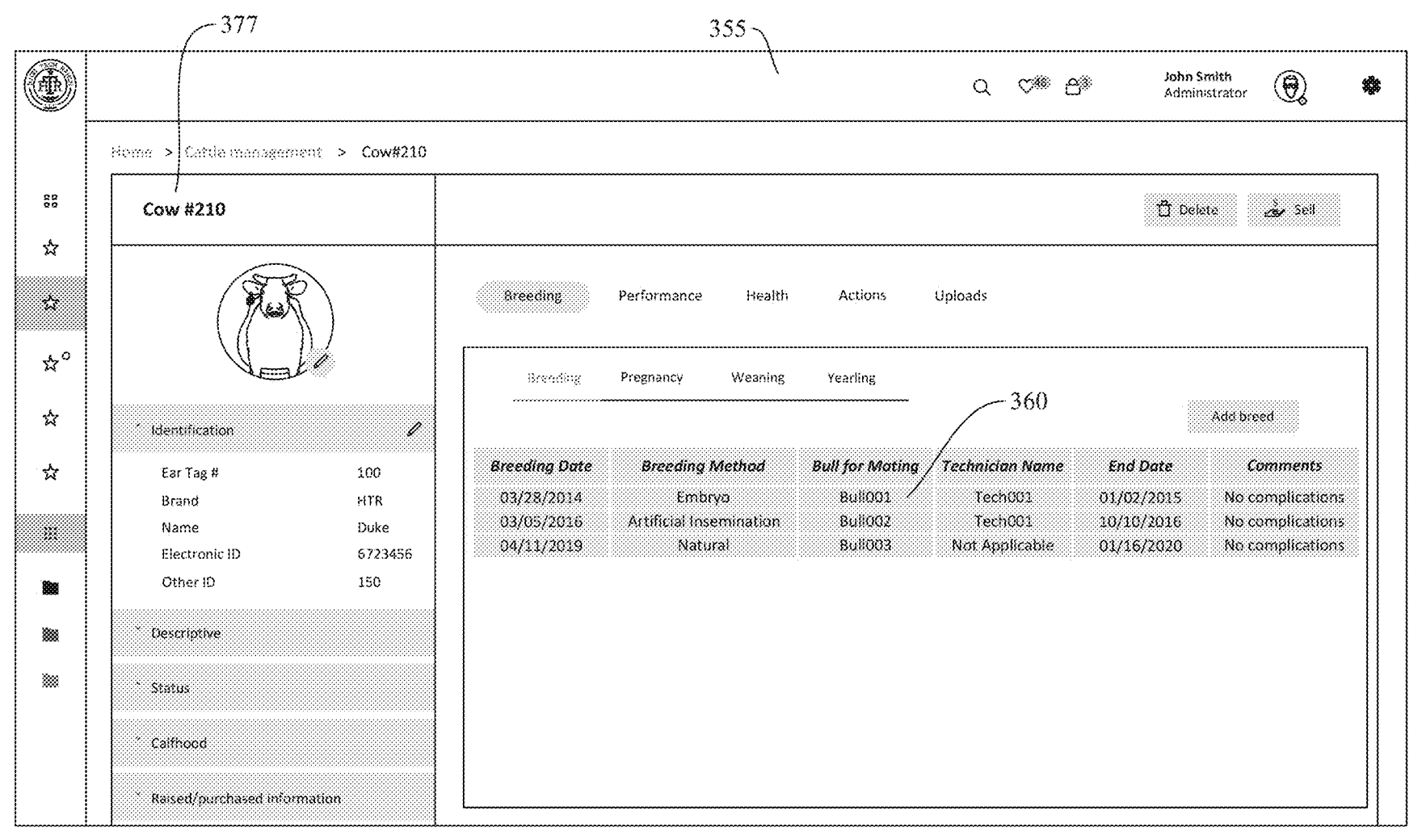

Continuing, FIG. 3H shows a breeding history interface 355 of a client-side software application for smart cattle reproduction management in accordance with one or more embodiments of the present invention. As previously discussed, the profitability of cattle ranching operations is dependent, to a large extent, on the calf crop percentage. In one or more embodiments of the present invention, data is tracked, monitored, and analyzed so that appropriate actions may be taken to enhance reproductive efficiency. In the breeding history interface 355, the complete breeding history of a heifer, cow, or bull, in this instance, cow 377, may be tracked and may be used in part to calculate a reproduction performance score for open heifers, cows, or bulls as described in more detail herein. A user or administrator (not shown) may search, browse, add, delete, or change information about the animal's breeding history. For example, a breeding history record 360 may include a breeding date, a breeding method (embryo, artificial insemination, or natural), the bull that the cow 377 mated with, a technician name, if any, that assisted with the pregnancy, and a calving date or predicted calving date. One of ordinary skill in the art will appreciate that any other relevant information to breeding history may be included in accordance with one or more embodiments of the present invention. Continuing, FIG. 3I shows a pregnancy tracking interface 365 of a client-side software application for smart cattle reproduction management in accordance with one or more embodiments of the present invention. For each pregnancy, a heifer or cow, in this example, cow 377, various information relating to their pregnancy may be tracked. For example, the information may include the pregnancy status, pregnancy check date, pregnancy check method, number of days pregnant, estimated due date, and sex determination. One of ordinary skill in the art will appreciate that any other relevant information to the pregnancies of the cattle may be included in accordance with one or more embodiments of the present invention.

In one or more embodiments of the present invention, a method of cattle reproduction management for an open heifer or cow may calculate a reproductive performance score for the open heifer or cow. If the heifer or cow's reproductive performance score falls below an acceptable range, there is a probability that the animal will not be able to conceive. With this information, the cattle rancher may make an informed decision to cull the animal rather than continuing to expend resources and carrying costs for the animal. The method may include receiving, by the server-side software application, information transmitted by a tag disposed on the open heifer or cow. The information may be transmitted by the ear tag (e.g., 100) disposed on the open heifer or cow to one or more LoRa® WAN field antennas or LoRa® WAN gateways to the server-side software application (e.g., 240) that receives the information transmitted by the ear tag (e.g., 100). The information transmitted may include a unique identifier of the open heifer or cow, typically a unique identifier of the open heifer or cow associated with the open heifer or cow in the server-side software application, a current location of the open heifer or cow, and a current temperature of the open heifer or cow. The method may further include determining if the open heifer or cow is in heat based at least in part on the information received. In certain embodiments, the open heifer or cow may be determined to be in heat when the open heifer or cow travels excessively relative to other bovines and historical data, if any, of prior patterns of traveling movement when in heat. Using information transmitted by the ear tag (e.g., 100) of the animal, the server-side software application (e.g., 240) may track the traveling movement of the open heifer or cow as well as the location of other bovines. In certain embodiments, traveling may be excessive when the open heifer or cow travels a predetermined distance more than an average distance traveled by other bovines in the herd. A heifer or cow in heat tends to travel three to four times more than other bovines. In other embodiments, traveling may be excessive when the open heifer or cow travels a predicted distance more than average based on machine learning or artificial intelligence algorithms. In such embodiments, the traveling patterns of the entire herd, the traveling pattern of pregnant open heifers or cows, or the travelling patter of the open cow in the past may be used in a predictive or pattern recognizing algorithm to predict when the open heifer or cow is in fact traveling. In other embodiments, the open heifer or cow may be determined to be in heat when the open heifer or cow is riding other open heifers, cows, or a bull. Using the information transmitted by the ear tag (e.g., 100) of the animal, the server-side software application (e.g., 240) may track a location of the open heifer or cow relative to a location of other bovines. Riding may be identified when a location of the open heifer or cow is within a predetermined proximity to other open heifers, cows, or a bull, indicating that open heifer or cow is presently riding another bovine. In still other embodiments, the open heifer or cow may be determined to be in heat when the open heifer or cow is physically examined and determined to be in heat. In such embodiments, the server-side software application (e.g., 240) may receive examination data related to the open heifer or cow being in heat from a user or administrator (not shown).

The method may further include providing an alert to a user if the open heifer or cow is in heat. The server-side software application may cause an alert to be displayed on the client-side software application indicating that a particular heifer or cow is in heat. The alert may include a graphical depiction of the heifer or cow and its location with respect to a pasture and farm so that the cattle rancher may locate the open heifer or cow in heat and take appropriate action. This allows the method and system to record the estrous cycle and determine a window of time for future estrous cycles that enables the cattle rancher to know when to expose a female to a bull or to administer artificial insemination to increase the chances of conception. In one or more embodiments of the present invention, a reproductive performance score may be calculated for the open heifer or cow as an indicator of reproductive efficiency. The method may further include determining an amount of time that the open heifer or cow spends within an active breeding proximity circle based at least in part on the information received. An active breeding proximity circle may be a predetermined radius extending from a center mass of one or more other open heifers or cows also in heat. Since in heat heifers and cows tend to breed socially, the identification of an active breeding proximity circle may confirm which heifers or cows are in heat, help establish approximate conception dates, and help calculate their reproductive performance score. The method may further include calculating a reproductive performance score for the open heifer or cow based at least in part on the information received. In certain embodiments, the reproductive performance score may include calculating a weighted average based on a formula comprised of one or more of age, weight, a number of times the open heifer or cow was exposed to the bull for a predetermined period of time, the open heifer or cow's conception rate, the ability of the open heifer or cow to maintain weight after calving and nursing, the open heifer or cow's body condition score after calving and nursing, the open heifer or cow's ability to nurse and put weight on a birthed calf, and the calving history that illustrates the female's ability to produce offspring within a normal time frame and exposure rate. One of ordinary skill in the art will recognize that other factors and the weights associated with the included factors may vary based on an application or design in accordance with one or more embodiments of the present invention. The method may further include updating a breeding record for the open heifer or cow based on a current heat cycle. The record update may include the date of conception, the bull that sired the calf, a predicted due or calving date, among other information. In certain embodiments, the method may further include determining a heat cycle start date based on one or more of the open heifer or cow being located within the active breeding proximity circle for at least a predetermined amount of time and historical data, if any, of prior heat cycle start dates and heat cycle periods. In certain embodiments, the method may further include calculating a next heat cycle start date based on the current heat cycle start date and one or more of historical data, if any, of heat cycle periods or estimated heat cycle periods based on the open heifer or cow or other open heifers or cows within a predetermined proximity of the open heifer or cow. In certain embodiments, the method may further include determining whether the open heifer or cow is pregnant based on received information or inputted examination data.

In one or more embodiments of the present invention, a method of cattle reproduction management for a bull may calculate a reproductive performance score for the bull. The reproductive performance score may be used to identify the best bulls that should be exposed to the herd and cull or sell the underperforming bulls to increase the calf crop ratio. The method may include receiving, by the server-side software application, information transmitted by a tag disposed on the bull. The information may be transmitted by the ear tag (e.g., 100) disposed on the bull to one or more LoRa® WAN field antennas or LoRa® WAN gateways to the server-side software application (e.g., 240) that receives the information transmitted by the ear tag (e.g., 100). The information transmitted may include one or more of a unique identifier of the bull, a current location of the bull, and a current temperature of the bull. The method may further include determining an amount of time that the bull spends within an active breeding proximity circle based at least in part on the information received. The active breeding proximity circle may be established by a predetermined radius of one or more open heifers or cows in heat. In certain embodiments, the open heifers or cows may be determined to be in heat when the open heifers or cows travel excessively relative to other bovines and historical data, if any, of prior patterns of traveling movement when in heat.

Using information transmitted by the ear tag (e.g., 100) of the animal, the server-side software application (e.g., 240) may track the traveling movement of the open heifer or cow as well as the location of other bovines. In certain embodiments, traveling may be excessive when the open heifer or cow travels a predetermined distance more than an average distance traveled by other bovine in the herd. In other embodiments, traveling may be excessive when the open heifer or cow travels a predicted distance more than average based on machine learning or artificial intelligence algorithms. In such embodiments, the traveling patterns of the entire herd, the traveling pattern of pregnant open heifers or cows, or the travelling patter of the open cow in the past may be used in a predictive or pattern recognizing algorithm to predict when the open heifer or cow is in fact traveling. In other embodiments, the open heifer or cow may be determined to be in heat when the open heifer or cow is riding other open heifers, cows, or a bull. Using the information transmitted by the ear tag (e.g., 100) of the animal, the server-side software application (e.g., 240) may track a location of the open heifer or cow relative to a location of other bovines. Riding may be identified when a location of the open heifer or cow is within a predetermined proximity to other open heifers, cows, or a bull, indicating that open heifer or cow is presently riding another bovine. In still other embodiments, the open heifer or cow may be determined to be in heat when the open heifer or cow is physically examined and determined to be in heat. In such embodiments, the server-side software application (e.g., 240) may receive examination data related to the open heifer or cow being in heat from a user or administrator (not shown).

The method may further include calculating a reproductive performance score for the bull based at least in part on the information received. Calculating the reproductive performance score for the bull may include calculating a weighted average of one or more of an amount of time the bull was exposed to the active breeding proximity circle, a number of times the bull was exposed to the active breeding proximity circle for a predetermined period of time, a body condition of the bull, and a birthweight of the bull's offspring, age, and an amount of traveling an active and engaged bull exhibits in relation to other bovines. One of ordinary skill in the art will recognize that other factors and the weights associated with the included factors may vary based on an application or design in accordance with one or more embodiments of the present invention. The method may further include updating a breeding record for the bull. The cattle rancher may use the reproductive performance score to make informed decisions about the performance of the bull, allowing the rancher to put the best bulls with the herd and cull or sell the underperforming animals to increase the calf crop ratio.

Figure 3J:
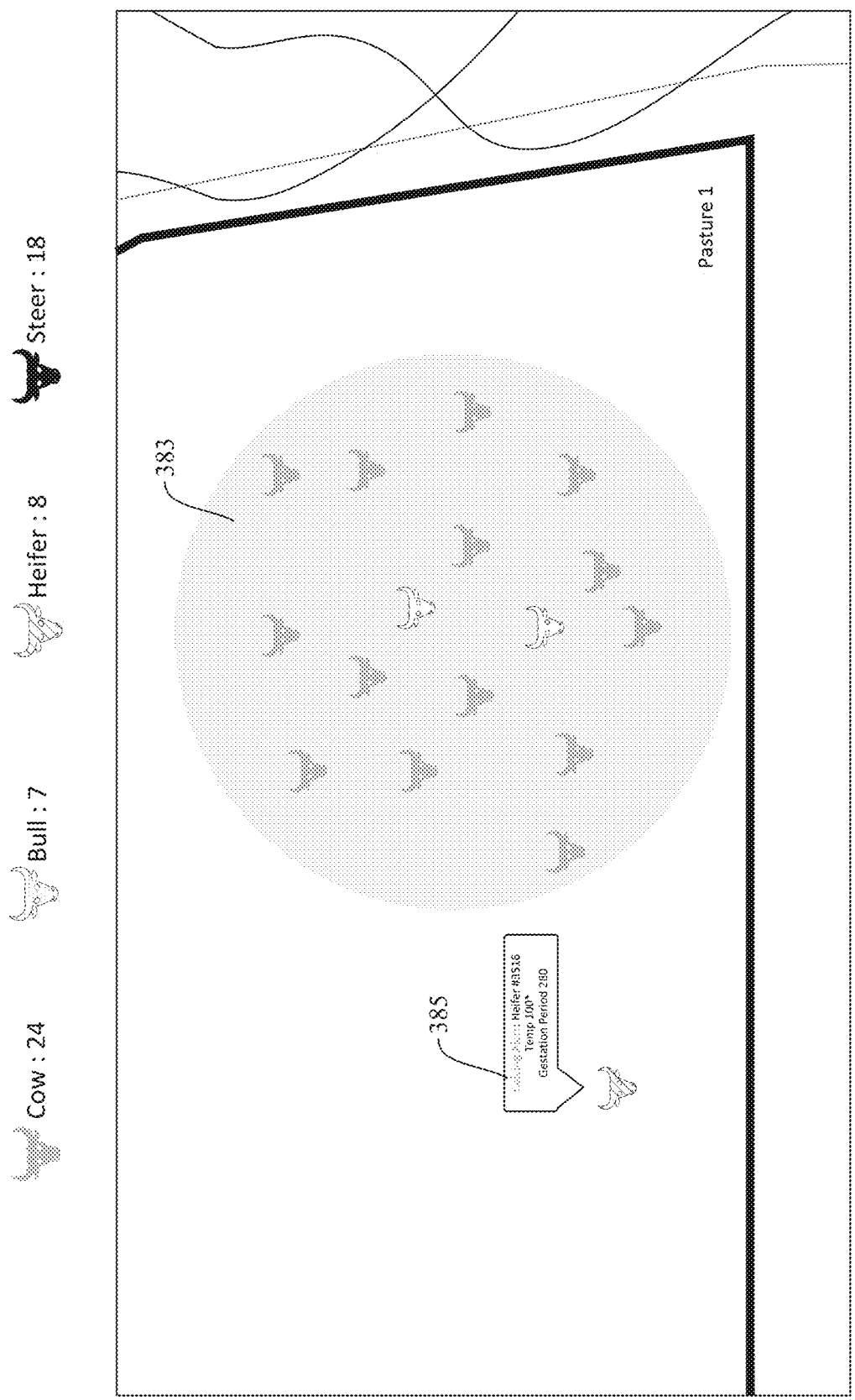
FIG. 3J shows a calving alert of a client-side software application for smart cattle reproduction management in accordance with one or more embodiments of the present invention.

Continuing, FIG. 3J shows a calving alert 385 of a client-side software application for smart cattle reproduction management in accordance with one or more embodiments of the present invention. In one or more embodiments of the present invention, a method of cattle reproduction management for a pregnant heifer or cow includes receiving information transmitted by a tag disposed on the pregnant heifer or cow, where the information includes one or more of an identifier of the pregnant heifer or cow, a location of the pregnant heifer or cow, and a temperature of the pregnant heifer or cow. The method may further include calculating a predicted calving date for the pregnant heifer or cow based on at least one or more of historical data, if any, of prior gestation periods or an estimated gestation period. The method may further include tracking the location of the pregnant heifer or cow relative to other bovines in a herd. The method may further include determining if the pregnant heifer or cow is isolating herself from the herd based at least in part on the location of the pregnant heifer or cow relative to the other bovines in the herd. In certain embodiments, the pregnant heifer or cow may be isolating herself from the herd when the pregnant heifer or cow is 10 or more meters from the herd for at last an hour or more. In other embodiments, the pregnant heifer or cow may be isolating herself from the herd when the pregnant heifer or cow is 20 or more meters from the herd for at last an hour or more. In still other embodiments, the pregnant heifer or cow may be isolating herself from the herd when her behavioral pattern indicates, by way of history or pattern, isolation. The method may further include determining if the temperature of the pregnant heifer or cow drops a predetermined amount within a predetermined number of days of the predicted calving date. In certain embodiments, the pregnant heifer or cow may be calving when the temperature drops at least 1 degree or more. The method may further include providing an alert that the pregnant heifer or cow is calving if the pregnant heifer or cow is isolating from the herd and the pregnant heifer or cow's temperature has dropped the predetermined amount within the predetermined number of days of the predicted calving date.

In one or more embodiments of the present invention, a method of farm to market transparency may include tracking one or more metrics of a bovine from farm to market. The one or more metrics may include one or more of a history of age, weight, health, illness, diagnoses, treatment, stress, body condition scoring, reproductive performance scoring, the types and kinds of pastures that lived in, and the food they consumed. In essence, any metric capable of being tracked may be logged and provided. In certain embodiments, a food quality indicator may be calculated based on one or more of the above-noted metrics. Any one or more of the metrics, as well as the food quality indicator, may be provided to the market, and ultimately, to a consumer, so that they consumer has total visibility to the history of the animal they will consume. The present invention provides an end-to-end digital ecosystem linking the cattle rancher to the consumer.

Figure 4:
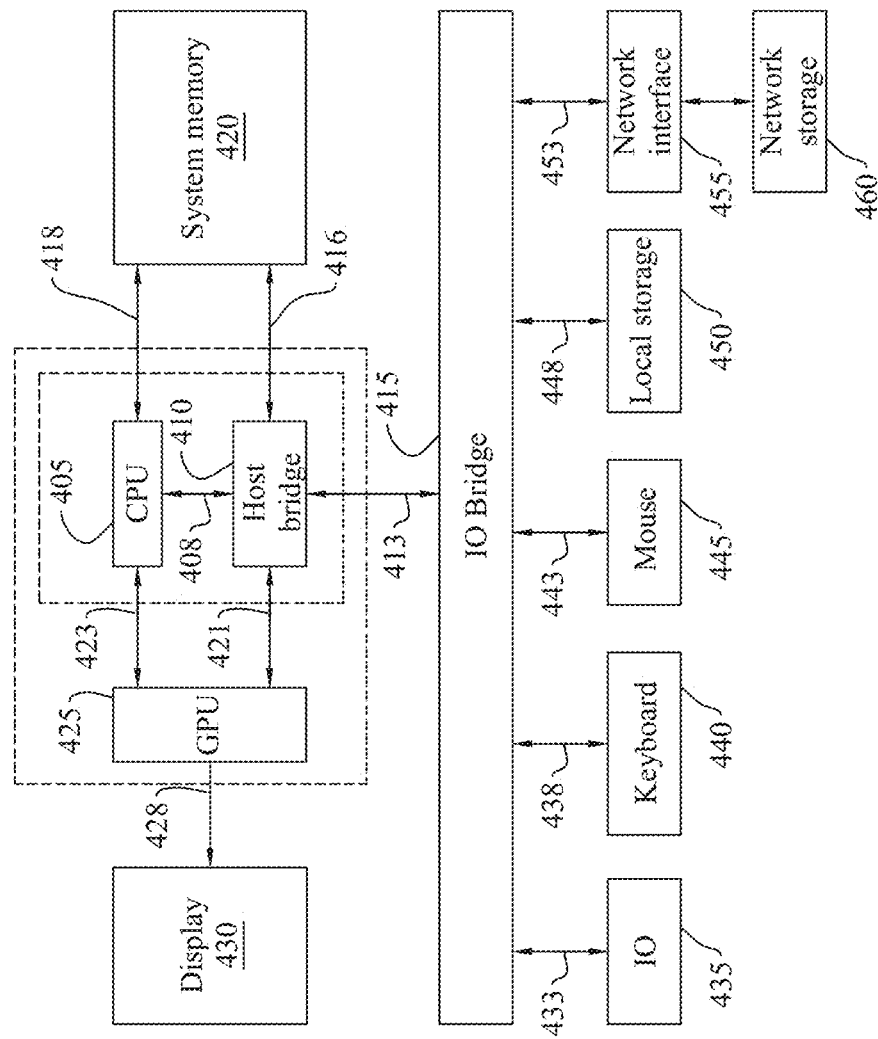
FIG. 4 shows an exemplary computing system for executing a server-side smart cattle reproduction software application in accordance with one or more embodiments of the present invention.

FIG. 4 shows an exemplary computing system 400 for executing a server-side smart cattle reproduction software application in accordance with one or more embodiments of the present invention. An exemplary computing system 400 may include one or more of Central Processing Unit ("CPU") 405, host bridge 410, Input/Output ("IO") bridge 415, Graphics Processing Unit ("GPUs") 425, Application-Specific Integrated Circuit ("ASIC") (not shown), and PLC (not shown) disposed on one or more printed circuit boards (not shown) that perform computational or logical operations. Each computational device may be a single-core device or a multi-core device. Multi-core devices typically include a plurality of cores (not shown) disposed on the same physical die (not shown) or a plurality of cores (not shown) disposed on multiple die (not shown) that are collectively disposed within the same mechanical package (not shown). CPU 405 may be a general-purpose computational device that executes software instructions. CPU 405 may include one or more of interface 408 to host bridge 410, interface 418 to system memory 420, and interface 423 to one or more IO devices, such as, for example, one or more optional GPUs 425. GPU 425 may serve as a specialized computational device that typically performs graphics functions related to frame buffer manipulation. However, one of ordinary skill in the art will recognize that GPU 425 may be used to perform non-graphics related functions that are computationally intensive. In certain embodiments, GPU 425 may interface 425 directly with CPU 405 (and indirectly interface 418 with system memory 420 through CPU 405). In other embodiments, GPU 425 may interface 421 directly with host bridge 410 (and indirectly interface 416 or 418 with system memory 420 through host bridge 410 or CPU 405 depending on the application or design). In still other embodiments, GPU 425 may directly interface 433 with IO bridge 415 (and indirectly interface 416 or 418 with system memory 420 through host bridge 410 or CPU 405 depending on the application or design). One of ordinary skill in the art will recognize that GPU 425 includes on-board memory as well. In certain embodiments, the functionality of GPU 425 may be integrated, in whole or in part, with CPU 405 and/or host bridge 410, if included at all.

Host bridge 410 may be an interface device that interfaces between the one or more computational devices and IO bridge 415 and, in some embodiments, system memory 420. Host bridge 410 may include interface 408 to CPU 405, interface 413 to IO bridge 415, for embodiments where CPU 405 does not include interface 418 to system memory 420, interface 416 to system memory 420, and for embodiments where CPU 405 does not include an integrated GPU 425 or interface 423 to GPU 425, interface 421 to GPU 425. The functionality of host bridge 410 may be integrated, in whole or in part, with CPU 405 and/or GPU 425. IO bridge 415 may be an interface device that interfaces between the one or more computational devices and various IO devices (e.g., 440, 445) and IO expansion, or add-on, devices (not independently illustrated). IO bridge 415 may include interface 413 to host bridge 410, one or more interfaces 433 to one or more IO expansion devices 435, interface 438 to optional keyboard 440, interface 443 to optional mouse 445, interface 448 to one or more local storage devices 450, and interface 453 to one or more optional network interface devices 455. The functionality of IO bridge 415 may be integrated, in whole or in part, with CPU 405, host bridge 410, and/or GPU 425. Each local storage device 450, if any, may be a solid-state memory device, a solid-state memory device array, a hard disk drive, a hard disk drive array, or any other non-transitory computer readable medium. An optional network interface device 455 may provide one or more network interfaces including any network protocol suitable to facilitate networked communications. Computing system 400 may include one or more optional network-attached storage devices 460 in addition to, or instead of, one or more local storage devices 450. Each network-attached storage device 460, if any, may be a solid-state memory device, a solid-state memory device array, a hard disk drive, a hard disk drive array, or any other non-transitory computer readable medium. Network-attached storage device 460 may or may not be collocated with Computing system 400 and may be accessible to computing system 400 via one or more network interfaces provided by one or more network interface devices 455.

One of ordinary skill in the art will recognize that computing system 400 may be a conventional computing system such as that depicted in FIG. 4 or an application-specific computing system (not shown) configured for industrial applications, such as a PLC based system (not shown). In certain embodiments, an application-specific computing system (not shown) may include one or more ASICs (not shown) or PLCs (not shown) that perform one or more specialized functions in a more efficient manner. The one or more ASICs (not shown) or PLCs (not shown) may interface directly with CPU 405, host bridge 410, or GPU 425 or interface through 10 bridge 415. Alternatively, in other embodiments, an application-specific computing system (not shown) may represent a reduced number of components that are necessary to perform a desired function or functions in an effort to reduce one or more of chip count, printed circuit board footprint, thermal design power, and power consumption. In such embodiments, the one or more ASICs (not shown) and/or PLCs (not shown) may be used instead of one or more of CPU 405, host bridge 410, 10 bridge 415, or GPU 425, and may execute software instructions. In such systems, the one or more ASICs (not shown) or PLCs or (not shown) may incorporate sufficient functionality to perform certain network, computational, or logical functions in a minimal footprint with substantially fewer component devices.

As such, one of ordinary skill in the art will recognize that CPU 405, host bridge 410, 10 bridge 415, GPU 425, ASIC (not shown), or PLC (not shown) or a subset, superset, or combination of functions or features thereof, may be integrated, distributed, or excluded, in whole or in part, based on an application, design, or form factor in accordance with one or more embodiments of the present invention. Thus, the description of computing system 400 is merely exemplary and not intended to limit the type, kind, or configuration of component devices that constitute a computing system 400 suitable for performing computing operations in accordance with one or more embodiments of the present invention.

One of ordinary skill in the art, having the benefit of this disclosure, will recognize that one or more non-transitory computer-readable media may comprise software instructions that, when executed by a processor, may perform one or more of the above-noted methods in accordance with one or more embodiments of the present invention.

Advantages of one or more embodiments of the present invention may include one or more of the following:

In one or more embodiments of the present invention, a method and system for smart cattle reproduction management may include calculating a reproductive performance score for an open heifer or cow or bull based on actual data obtained over time. The method and system may track, monitor, and predict reproductive efficiency, providing actionable information that allows the cattle rancher to optimize operations to ensure a high calf crop percentage.

In one or more embodiments of the present invention, a method and system for smart cattle reproduction management may use conventional ear tags disposed on heifers, cows, and bulls to track and monitor their location, their temperature, and the patterns of movement of all animals in the herd. A highly accurate and data-driven reproductive performance score may be calculated for the open heifers, cows, and bulls, thereby allowing actions to be taken to enhance reproductive efficiency.

In one or more embodiments of the present invention, a method and system for smart cattle reproduction management may prevent the loss of heifers during calving. Given the high risk of losing a heifer during calving, the method and system provide means to detect, in advance, and potentially remotely, when a pregnant heifer or cow is about to start calving allowing the cattle rancher to go on site, locate the animal, and provide any veterinary assistance that may be required should the delivery be difficult.

In one or more embodiments of the present invention, a method and system for smart cattle reproduction management allows a cattle rancher to track, monitor, and enhance the reproductive efficiency of the herd remotely, resulting in an improved calf crop percentage.

In one or more embodiments of the present invention, a method and system for smart cattle reproduction management allows for the formation of a collective of cattle ranchers that may jointly manage and share resources and go to market with the bargaining power of a larger producer.

In one or more embodiments of the present invention, a method and system of cattle management may provide complete and total transparency to enhance the value and marketability of beef products for the buyer and the ultimate consumer, thereby enhancing the return on investment for the cattle ranchers.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A method of cattle reproduction management for a pregnant heifer or cow comprising:
   receiving information transmitted by a tag disposed on the pregnant heifer or cow, wherein the information comprises one or more of an identifier of the pregnant heifer or cow, a location of the pregnant heifer or cow, and a temperature of the pregnant heifer or cow;
   calculating a predicted calving date for the pregnant heifer or cow based on at least one or more of historical data, if any, of prior gestation periods or an estimated gestation period;
   tracking the location of the pregnant heifer or cow relative to other bovines in a herd;
   determining if the pregnant heifer or cow is isolating herself from the herd based at least in part on the location of the pregnant heifer or cow relative to the other bovines in the herd;

determining if the temperature of the pregnant heifer or cow drops a predetermined amount within a predetermined number of days of the predicted calving date; and providing an alert that the pregnant heifer or cow is calving if the pregnant heifer or cow is isolating from the herd and the pregnant heifer or cow's temperature has dropped the predetermined amount within a predetermined number of days of the predicted calving date.

2. The method of claim 1, wherein the pregnant heifer or cow is isolating herself from the herd when the pregnant heifer or cow is 10 or more meters from the herd for at least an hour or more.

3. The method of claim 1, wherein the pregnant heifer or cow is calving when the temperature drops at least 1 degree or more.

* * * * *